(12) United States Patent
Foster et al.

(10) Patent No.: US 7,444,414 B2
(45) Date of Patent: Oct. 28, 2008

(54) SECURE RESOURCE ACCESS IN A DISTRIBUTED ENVIRONMENT

(75) Inventors: Ward S. Foster, Boise, ID (US); Shell Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1390 days.

(21) Appl. No.: 10/193,000

(22) Filed: Jul. 10, 2002

(65) Prior Publication Data

US 2004/0010603 A1    Jan. 15, 2004

(51) Int. Cl.
*G06F 15/16* (2006.01)
(52) U.S. Cl. .................. 709/229; 709/229; 709/225; 709/226; 709/227; 709/228; 726/2; 726/4; 726/5; 726/10; 713/182
(58) Field of Classification Search ......... 709/224–229; 726/2, 4–5, 10; 713/182, 200–202
See application file for complete search history.

(56) References Cited

U.S. PATENT DOCUMENTS

| | | | |
|---|---|---|---|
| 6,226,752 B1 * | 5/2001 | Gupta et al. ................... 726/9 |
| 6,408,336 B1 * | 6/2002 | Schneider et al. ........... 709/229 |
| 6,460,141 B1 * | 10/2002 | Olden ........................... 726/4 |
| 6,668,322 B1 * | 12/2003 | Wood et al. ................. 713/182 |
| 2003/0074580 A1 * | 4/2003 | Knouse et al. .............. 713/201 |

* cited by examiner

*Primary Examiner*—John Follansbee
*Assistant Examiner*—Saket K Daftuar

(57) ABSTRACT

A method and system for providing a first network resource with secure but limited access to a second network resource. A method embodying the invention includes receiving, from a client, a request to access the first resource. The client is then directed to an authorization service. The authorization service generates an authorization ticket and provides the authorization ticket to the first resource. On behalf of the first resource, the authorization ticket is presented to the second resource with a request to access the second resource. The request is granted only if it can be verified that the authorization ticket was generated by a source trusted by the second resource.

26 Claims, 5 Drawing Sheets

| 28 | ACCESS DATABASE | | |
|---|---|---|---|
| | 46 | 48 | 50 |
| | USER | RESOURCE | AUTHORITY |
| 44 | user(1) | www.resource(1).com | www.authority(1).com |
| | user(2) | www.resource(2).com | www.authority(2).com |
| | ... | ... | ... |
| | user(n) | www.resource(n).com | www.authority(n).com |

FIG. 3

| 38 | AUTHORIZATION DATABASE | | |
|---|---|---|---|
| | 54 | 56 | 58 |
| | USER | RESOURCE | POLICY |
| 52 | user(1) | www.resource(1).com | policy-data(1) |
| | user(2) | www.resource(2).com | policy-data(2) |
| | ... | ... | ... |
| | user(n) | www.resource(n).com | policy-data(n) |

FIG. 4

SECURE RESOURCE ACCESS IN A DISTRIBUTED ENVIRONMENT

FIELD OF THE INVENTION

The present invention is directed to a method and system for accessing a distributed resource. More particularly, the invention is directed to a method and system for providing secure but limited access to a resource in a distributed environment.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending the data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

Consequently, granting one resource access to another resource compounds the security considerations. Using the example above, a user presents one set of credentials to access the printing resource. The user then provides the printing resource with a second set of credentials needed to access the data resource. Here lies the problem. Conventional communication techniques such as Secure Hypertext Protocol provide the user reasonable assurance that third parties cannot intercept credentials being passed. However, the user has no assurance that the printing resource will not again access the data resource using the provided credentials without the user's consent or knowledge.

SUMMARY OF THE INVENTION

Accordingly, the present invention is directed to a method and system for providing a first network resource with secure but limited access to a second network resource. A method embodying the invention includes receiving, from a client, a request to access the first resource. The client is then directed to an authorization service. The authorization service generates an authorization ticket and provides the authorization ticket to the first resource. On behalf of the first resource, the authorization ticket is presented to the second resource with a request to access the second resource. The request is granted only if it can be verified that the authorization ticket was generated by a source trusted by the second resource.

DESCRIPTION OF THE DRAWINGS

FIG. 3 is a table illustrating an access database according to an embodiment of the present invention.

FIG. 4 is a table illustrating an authorization database according to an embodiment of the present invention.

DETAILED DESCRIPTION OF THE INVENTION

Figure 1:
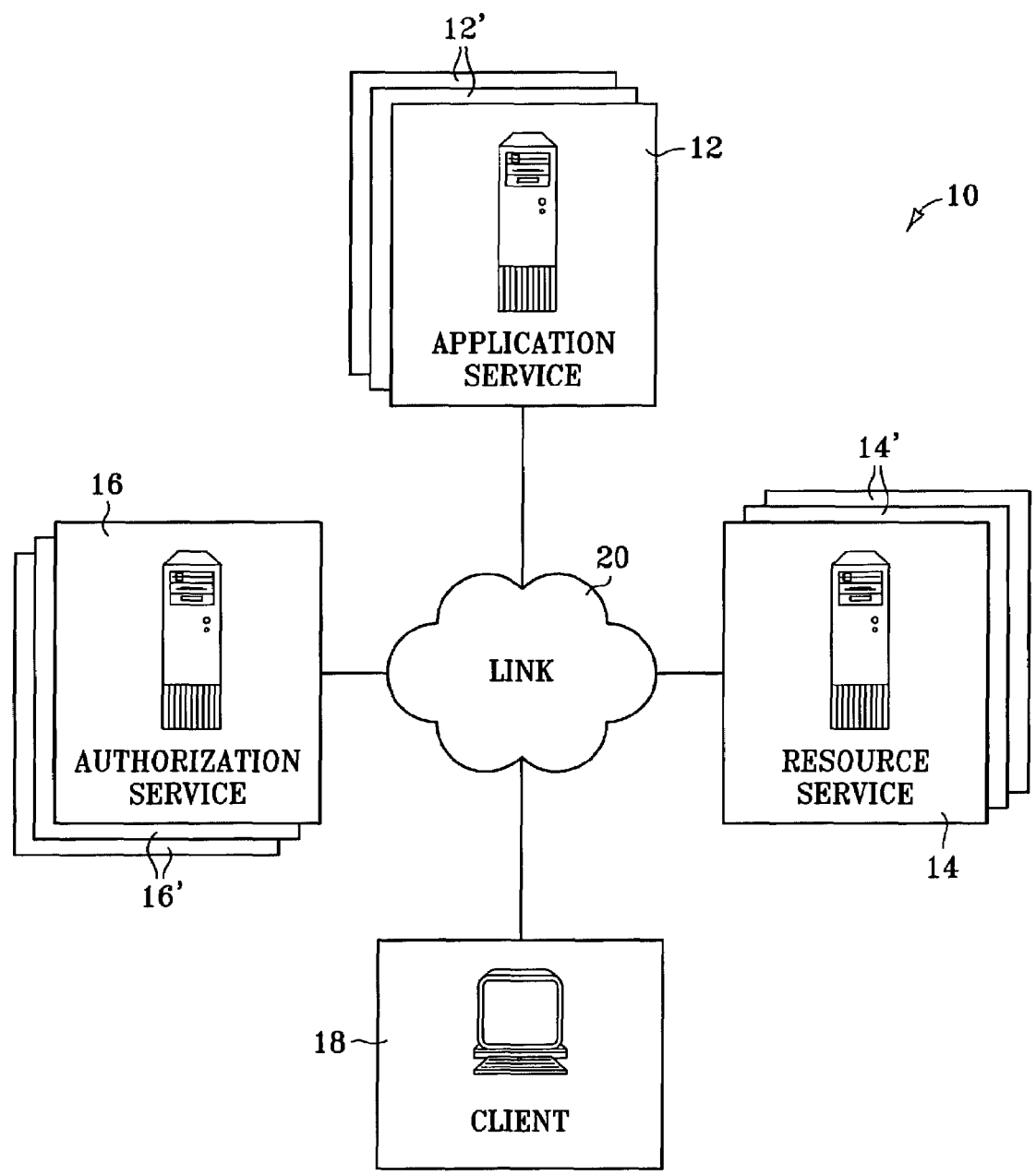
FIG. 1 is a schematic representation of a computer network in which various embodiments of the present invention may be incorporated.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning the requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Interface: The junction between a user and a computer program providing commands or menus through which a user communicates with the program. The term user in this context represents generally any individual or mechanism desiring to communicate with the program. For example, in the client-server model defined above, the server usually generates and delivers to a client an interface for communicating with a program operating on or controlled by the server device. Where the server is a web server, the interface is a web page. The web page, when displayed by the client device, presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Session: An instance of the operation of a program under the control of a particular user. For example, a program or application served over the Internet may be accessed by more than one user at one time. Each instance of a user accessing the program is an application session. A session interface then is an interface for interacting with a particular application session.

Distributed Environment: A computing environment in which various program elements needed to complete a particular task are running on different but interconnected computing devices. A distributed application is programming operating on one computing device that can be accessed and utilized by or from another computing device.

Digital Certificate: An attachment to an electronic message used for security purposes. The most common use of a digital certificate is to verify that a user sending a message is who he or she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet. The recipient of an encrypted message uses the CA's public key to decode the digital certificate attached to the message, and verify the certificate as being issued by the CA.

Introduction: In distributed computing environments, a user employs a client to access a particular application running on a server device. The user directs the application to manipulate electronic data located anywhere on a computer network. To do so, the user must provide the application with the information required to locate and access the data. It is expected that various embodiments of the present invention will enable the provision of this information with minimal user interaction while maintaining the user's security and privacy.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes application service 12, resource service 14, authorization service 16 and client 18. Application service 12 represents generally any combination of programming and/or hardware capable of distributing an application over network 10. Resource service 14 represents any combination of hardware and/or programming capable of providing a resource to a distributed application. Authorization service 16 represents generally any combination of hardware and/or programming capable of authorizing a request to access resource service 14. Client 18 represents any combination of hardware and/or programming capable of interacting with application service 12, resource service 14, and authorization service 16. Network 10 may also include one or more additional application services 12', resource services 14', and authorization services 16'. A given authorization service 16 or 16' may be capable of authorizing access to more then one resource service 14 and/or 14'

Link 20 interconnects components 12-18 and represents generally a cable, wireless, or remote connection via a telecommunication link, an infrared link, a radio frequency link, or any other connector or system that provides electronic communication between components 12-18. Link 20 may represent an intranet, an Internet, or a combination of both. Components 12-18 can be connected to network 10 at any point and the appropriate communication path established logically between the components.

Figure 2:
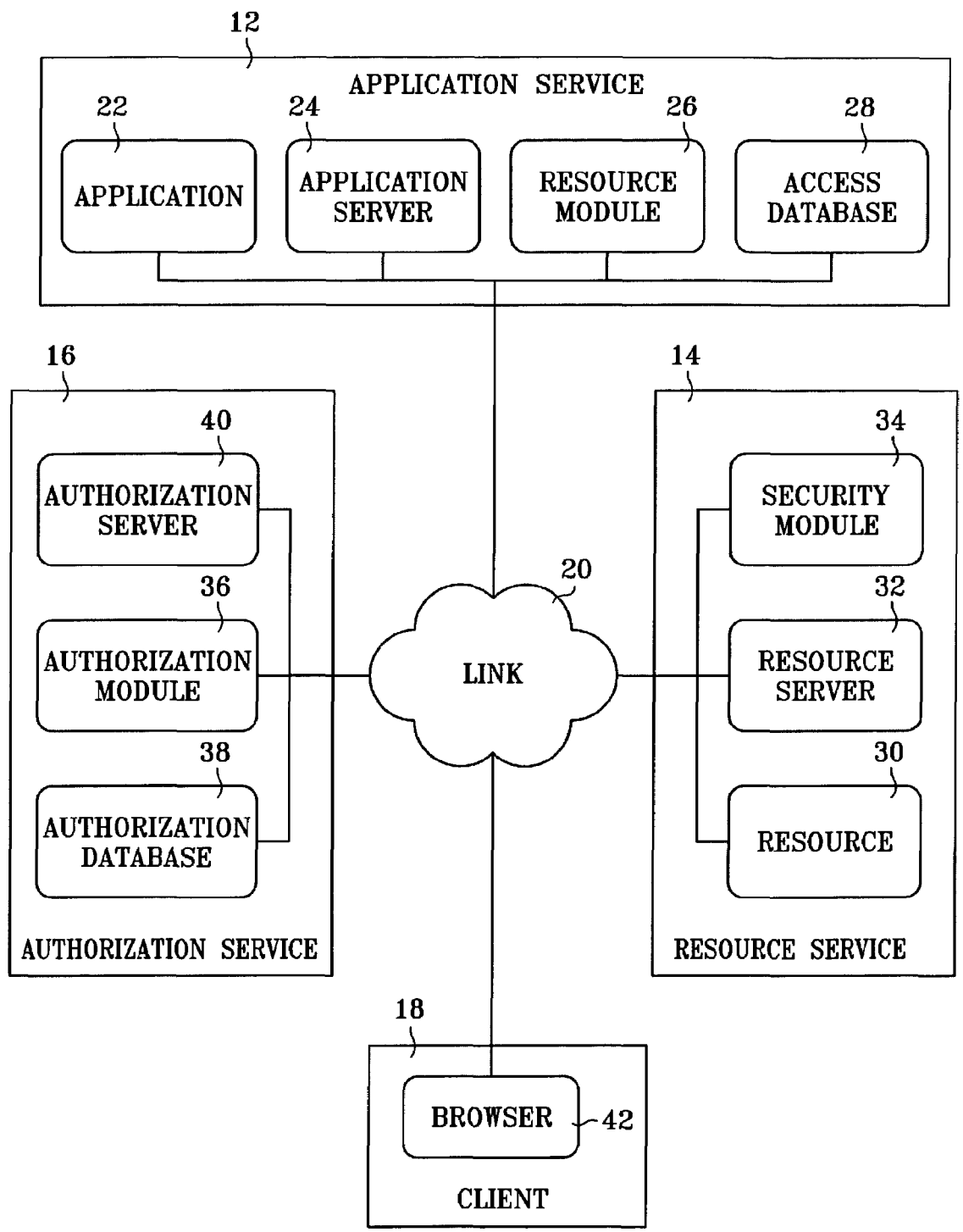
FIG. 2 is a block diagram of the network of FIG. 1 illustrating the logical program components operating on each device according to an embodiment of the present invention.

Components: The logical components of one embodiment of the invented resource access system will now be described with reference to the block diagram of FIG. 2. Application service 12 includes application 22, application server 24, resource module 26 and access database 28. Application 22 is a network resource and represents generally any application capable of being distributed over network 10. Application server 24 represents generally any programming capable of distributing application 22. Application server 24 is also capable of generating or otherwise providing a session interface to be displayed by client 18 enabling a user to interact with application 22. Resource module 26 represents generally any programming capable interacting with resource service 14, client 18, and, at least indirectly, authorization service 16. Resource module 26 may also be capable of providing content for a session interface enabling a user to interact with resource service 14. Access database 28 represents generally any logical memory to contain data used by resource module 26.

Resource service 14 includes resource 30, resource server 32, and security module 34. Resource 30 represents generally any programming and/or electronic data capable of being accessed and utilized over network 10. Resource server 32 represents any programming capable of making resource 30 available over network 10. Security module 34 represents any programming capable of limiting access to resource 30 to those providing verifiable credentials.

Authorization service 16 includes authorization module 36, authorization database 38, and authorization server 40. Authorization module 36 represents generally any programming capable of indirectly providing resource service 14 with data granting or denying a request to access resource 30. More specifically, authorization module 36 is responsible for receiving and acting upon a request from client 16 to authorize a request from application service 12 to access resource 30. Authorization database 38 represents any logical memory to contain data used by authorization module 36. Authorization server 40 represents generally any programming capable of making authorization module 36 available over network 10.

It is expected that servers 24, 32, and 40 will be web servers. Application 22, resource 30, and authorization module 36 then, may be web sites, web services, or a combination of the two. Client 18 contains browser 42 capable of communicating with servers 24, 32, and 40. Alternatively, in some instances, servers 24, 32, and 40 may be accessed or communicated with programmatically—not using browser 42.

Referring now to FIG. 3, access database 28 includes a number of entries 44. Each entry 44 contains a user field 46, a resource field 48, and an authority field 50. Each user field 46 contains data uniquely identifying a particular user. Each resource field 48 contains data uniquely identifying a particular resource service 14 or 14'. Each authority field 50 contains data identifying an authorization service 16 or 16'. In this example, the data in a particular entry 44 used to access a resource service or an authorization service is an URL (Uniform Resource Locator). However, any form of access data will suffice. The access data need only enable resource module 26 to access, at least indirectly, a particular resource service 14 or 14' or a particular authorization service 16 or 16'. It is expected that resource module 26 will use the access data to direct browser 42 to access authorization service 16 or 16' on its behalf.

Referring now to FIG. 4, authorization database 38 includes a number of entries 52. Each entry 52 includes a user field 54, a resource field 56, and a policy field 58. Each user field 54 contains data uniquely identifying a particular user. Each resource field 56 contains data uniquely identifying a particular resource service 14 or 14'. Each policy field 58 contains policy data used by authorization module 36 to authorize a request from a particular application service 12 or 12' to access a resource identified by data in resource field 56. A policy field 58 for a given entry 52 may contain policy data for multiple application services 12 and 12'.

Policy data can include, among other items, one or more of the following: credentials, a trust indicator, and/or an access indicator. The credentials are credentials needed to access a resource service 14 or 14' identified by data in resource field 56. A trust indicator is data indicating the level of user involvement required in authorizing access to that resource service 14 or 14'. The trust indicator may require that the user identified by data in user field 54 personally authorize each request from a particular application service 12 or 12' to access the same resource service 14 or 14'. The trust indicator may specify that the identified user trusts the particular application service 12 or 12' allowing the authorization service 16 to automatically authorize all requests from that application service 12 or 12'. Alternatively, the trust indicator data may specify that the authorization service 16 is to authorize all requests from application service 12 for a current session. In this case, the trust indicator also includes data, if any, identifying the current authorized session. An access indicator restricts the level of access to be granted—in other words—it restricts the availability of certain functions, features, or data provided by the identified resource service 14 or 14'. For example, where an application service 12 is a printing service and an identified resource service 14 is a document management service, an access indicator may restrict the printing service from accessing certain types of documents managed by the document management service. The trust indicator and the access indicator may also be interrelated. For example, the trust indicator may specify that a user need not personally authorize access requested at a particular level. A user may not desire to be bothered with personally authorize an access request to view a document. However, that user may desire to personally authorize all access requests to delete a document The block diagram of FIG. 2 and the tables of FIGS. 3 and 4 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s). While application service 12, resource service 14, and authorization service 16 are shown as distinct components of network 10, all may operate as a single component. Moreover, individual elements of application service 12, resource service 14, and authorization service 16 may be found on more than one device.

Additionally, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

Operation: The operation of the invented resource access method will now be described with reference to the flow diagram of FIG. 5. Initially, a user registers with application service 12 (step 60). This involves resource module 26 creating a new entry 44 for the user in access database 28. The new entry's user field 46 contains the user's credentials or other identifying data typically required to access application service 12. The entry's resource field 48 contains data identifying resource service 14, and authority field 50 contains data identifying authorization service 16. Other entries 44 in access database 28 may contain data identifying other users, other resource services 14' and/or other authorization services 16'. Multiple entries 44 may be associated with a single user. Step 60 is not necessarily required if application service 12 has some other way of identifying the user and determining resources associated with the user.

The user also registers with authorization service 16 (step 62). This involves creating a new entry 52 for the user in authorization database 38. The new entry's user field 54 contains the user's credentials or other identifying data typically required to access authorization service 16'. The entry's resource field 56 contains data identifying resource service 14. The entry's policy field 58 contains policy data used to determine how and at what level application service 12 may access the resource service, in this case resource service 14, identified by the data in the entry's resource field 56. Other entries 52 in authorization database 38 may contain data identifying other users and other resource services 14' with the policy data varying for each entry 52. Multiple entries 52 may be associated with a single user which can enable the user to establish different policies for different machines or groups of machines.

Once registered with application service 12 and authorization service 16, the user, through client 18, requests access to application service 12 (step 64). Typically, this involves browsing to a network address established for application server 24. Included with or provided or acquired following the request are credentials identifying the user. Application server 24 receives and forwards the request to application 22 which then establishes a new session for the user (step 66). Under the direction of application 22, resource module 26 uses the credentials to identify resource service 14 (step 68). The credentials identify a particular user. Resource module 26 locates an entry 44 in access database 28 that contains the credentials or other data identifying that user and acquires, from the entry's resource field 48, data identifying resource service 14. Earlier comments regarding using user identity apply here. Where access database 28 contains more than one entry 44 containing data identifying the user, resource module 26 parses those entries 44 for the one entry 44 with a resource field 48 containing data identifying resource service 14. Alternatively, when requesting access to application service 12 in step 64, the user may include data identifying resource service 14 along with the credentials identifying the user. In such cases, resource module 26 searches access database 28 for an entry 44 containing data identifying the user and resource service 14.

Resource module 26 then identifies the authorization service, in this case authorization service 16, responsible for authorizing requests from application service 12 to access resource service 14—that is—the resource service identified by the data in resource field 48 in the located entry 44 (step 70). Or identified in some other way. Authorization service 16 is identified by data in authority field 50 in the located entry 44. Or identified by some other way (such as calling a method on the resource service). It is expected that the data identifying authorization service 16 will be an URL (Uniform Resource Locator) that can be used to access authorization service 16. This URL is referred to as a redirection URL.

Resource module 26 modifies the redirection URL by adding data identifying the session established in step 66 and data identifying resource service 12. The following is an example of a modified redirection URL: http://www.authority.com/default?session=1234?app=www.applicationservice.com?resource=www.resource.com. The portion "www.authority.com/default" identifies authorization service 16. The added portion "?session=1234" identifies the session, the added portion "?app=www.applicationservice.com" is an URL identifying application service 12, and the added portion "?resource=www.resource.com" is an URL identifying the resource service 14 to be accessed.

Resource module 26 instructs application server 24 to redirect client 18 to the modified redirection URL for the identified authorization service 16. To redirect client 16, or more specifically browser 42, application server 24 provides browser 42 with instructions to access authorization service 16 using the modified redirection URL (step 72).

The redirection URL may additionally be modified to include information regarding the level of access required. For instance, a document repository resource might allow reading, writing, updating, and deleting of files. Reading files may require one level of access, writing files may require a second level, and updating or deleting files may require a third level of access. Authorization service 16 can alter its behavior based on the level of access requested. If read access is being requested, policy data may direct authorization service 16 to simply authorize the request without bothering the user. On the other hand, if write access is being requested, policy data may direct authorization service 16 to prompt the user to indicate whether or not this will be permitted for the current session. Further, if delete access is requested, policy data may direct authorization service 16 to deny access completely. Importantly, by encoding the kind of request required into the URL, the authorization service is able to avoid unnecessarily bothering the user.

Following the redirection instructions, browser 42 requests access to authorization service 16 using the modified URL, and provides the necessary credentials. The credentials may be provided manually, for example, in the form of a user name and password. Alternatively, the credentials may be provided in the form of a cookie. A cookie is a message given to a browser by a web server. The browser usually stores the message in a text file. The message, in many cases, is a simple alphanumeric data string unique to the given browser. The message is then sent back to the server each time the browser sends a request to the web server. In this case the cookie's message would be the credentials. When browser 42 is redirected and requests access to authorization service 16, authorization server 40 retrieves the cookie from browser 42. Authorization server 40 receives and forwards the request—along with the credentials, the data identifying the session, the data identifying application service 12, and, potentially, data indicating the level of access required or requested—to authorization module 36. Authorization module 36 first authenticates the user (step 74) using the credentials. It should be noted, however, that authentication of a user can occur in a number of other ways. For example, browser 42 could facilitate user authentication through one of several schemes. These schemes include: (1) basic, which is part of the HTTP 1.0 specification, using Windows user accounts; (2) digest or hash; (3) integrated Windows authentication; or (4) the use of digital certificates also known as client certificate mapping.

If the credentials are authentic or the user is otherwise authenticated, authorization module 36 acquires policy data for the identified application service 12 (step 75). To do so, authorization module 36 locates an entry 52 in authorization database 38 that contains data identifying the user as well as data identifying resource service 12. From the located entry 52, authorization module 36 acquires policy data for application service 12. As noted above, policy data can include credentials, a trust indicator, and/or an access indicator. Authorization module 36 then returns to client 18, in this case browser 42, interface content generated according to the policy data (step 76). Where no policy data exists or where the credentials, the trust indicator, or the access indicator are missing, authorization module 36 may provide browser 42 with interface content enabling the user to set policy data for application service 12. Where the trust indicator for application service 12 in the located entry 52 specifies that the user must authorize each request, authorization module 36 provides browser 42 with interface content enabling the user to grant or deny authorization for application service 12 to access resource service 14.

Where the trust indicator for application service 12 indicates that the user has authorized all requests made on behalf of application service 12 for a given session for a given level of access, authorization module 36 acquires data identifying the session established when client 18 accessed application service 12 in step 66. Authorization module 36 then determines whether the user has granted authorization for that session comparing the acquired data with data from the trust indicator that identifies the current authorized session. If the data does not match, authorization module 36 returns interface content enabling the user to grant or deny authorization for the new session established in step 66.

Where the trust indicator for application service 12 specifies that the user explicitly trusts application service 12 for a given access level and authorizes all requests made on its behalf or has authorized a current session, no interface content need be provided.

Browser 42 displays the content provided in step 76, if any, allowing the user to enter authorization instructions directing authorization service 16 to grant or deny application service 12 access to resource service 14. Browser 42 returns any authorization instructions to authorization service 16 (step 78). Authorization server 40 receives and forwards the authorization instructions to authorization module 36. Authorization module 36 then generates an authorization ticket according to the authorization instructions, if any, returned in step 78 as well as the access indicator from the policy data acquired in step 75. An authorization ticket is electronic data to be presented when requesting access to resource service 14. It includes a digital certificate for authorization service 16, indicating that access is to be granted as well as an access indicator.

If the user cannot be authenticated or if access is denied, no authorization ticket is generated and application service 12 is prevented from accessing resource service 14. Otherwise, authorization module 36 instructs authorization server 40 to redirect browser 42 back to application service 12 providing the authorization ticket (step 82). As described above, when browser 42 was redirected to authorization service 16 in step 72, browser 42 provided session data as well as data identifying application service 12. The data identifying application service 12 is expected to be an URL used to access application service 12, for example, an URL for returning to application service 12. Authorization module 36 modifies the URL identifying application server 12 by adding the session data as well as the authorization ticket generated in step 80. To redirect browser 42, authorization server 40 provides browser 42 with instructions to access application service 12 using that modified URL for application service 12.

Browser 42, using the modified URL, requests access to application service 12. Application server 24 receives and forwards the request to application 22. Application 22, using the session data in the modified URL for application service 12—the session data identifying the session established in step 66—recalls the identity of resource service 14 identified in step 68. Application 22 then directs resource module 26 to access resource service 14 using the authorization ticket provided with the modified URL for application service 12.

Presenting the authorization ticket, resource module 26 requests access to resource service 14 (step 84). Resource server 32 receives and forwards the request to security module 34. From the authorization ticket, security module 34 acquires the credentials, the digital certificate, and access indicator. In some instances, the application server 24 may digitally sign the authorization ticket and pass the signed authorization ticket to the resource. In these instances, the signature of application server 24 validates that application server 24 really is making the request. Similarly, the signature of authorization service 16 ensures that the authorization information provided in the authorization ticket is valid. Security module 34 authenticates the credentials as well as the digital certificate or certificates provided in the authorization ticket. If the credentials are authentic and the digital certificate or certificates properly identify authorization service 16 as a trusted authorization service for resource service 14, security module 34 grants application service 12 access to resource 30 at a level indicated by the access indicator.

In the description above, when modifying the URL used to redirect browser 42 in step 72, resource module 26 added data identifying application service 12—specifically an URL used by authorization service 16 to redirect browser 42 back to application service 12 in step 82. Alternatively, resource module 26 may add two URLs—the first to be used in step 82 when authorization has been granted and the second to be used when authorization has been denied. Where authorization has been granted, browser 42 is redirected in step 82 to the first URL and the process continues normally. Where authorization has been denied, browser 42 is redirected in step 82 to the second URL, which, for example, causes browser 42 to display information indicating that authorization to access resource service 14 has been denied.

Instead of redirecting client 18 back to application service 12 in step 82 to provide application service 12 with an authorization ticket, authorization service 16 may provide the authorization ticket through some other separate communications channel established between authorization service 16 and application service 12. HTTP (Hypertext Transport Protocol) and sockets are two examples. To establish this channel, resource module 26 may add to the URL used to redirect browser 42 to authorization service 16 in step 72 the address and protocol to be used to send the authorization ticket directly to application service 12. Alternatively, application service 12 may actively retrieve the authorization ticket from authorization service 16. In this case, authorization module 36 adds the address and protocol to be used to retrieve the authorization ticket to the URL used to redirect browser 42 back to application service 12 in step 82.

Figure 6:
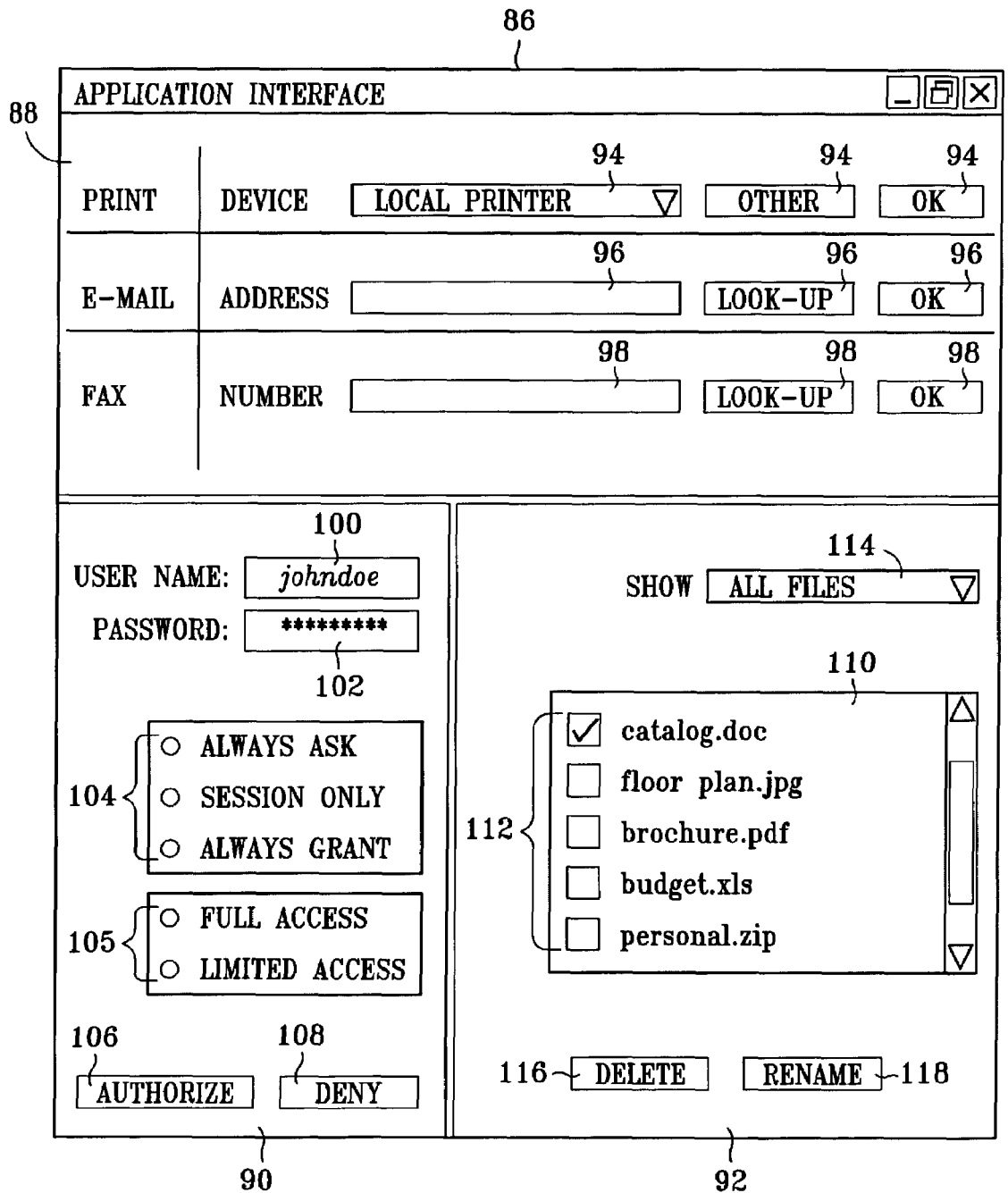
FIG. 6 is an exemplary screen view of an interface for producing electronic documents.

FIG. 6 illustrates a series of three exemplary screen views of web pages designed to enable a user to interact, at least indirectly, with application service 12, resource service 14, and, if necessary, authorization service 16. The first and third views are of framed web page 86 taken at different points in time, while the second view is of web page 88. A framed web page is a web page that divides the browser's display area into two or more sections or frames. The actual content of each frame is not provided by the framed web page itself. Rather, the framed web page provides, for each frame, a network address for accessing content to be displayed in that frame.

In this example, application 22 is a network resource providing document production services while resource 30 is a network resource providing remote document management. Web page 86 includes first frame 90, second frame 92. First frame 90 contains controls for interacting with application 22. In the first view, second frame 92 contains only text instructing the user to please wait. In the third view second frame contains controls for and managing electronic documents managed by resource 30. The content for first frame 90 may be provided to and displayed by browser 42 after requesting access to application service 12 in step 64. Consequently, the content appearing in first frame 90 in the first and third views of web page 86 is identical. Content for the second frame 92, however, is not provided until resource 30 is accessed following step 84.

Web page 88 contains controls for interacting with authorization service 16 and is displayed, if necessary, after application service 12 redirects browser 42 to authorization service 16 in step 72. Framed web page 86 is once again displayed when browser 42 is redirected back to application service 12 in step 82. Once security module 34 successfully authenticates the digital certificate contained in the authorization ticket and presented to resource service 14 in step 84, resource module 26 communicates with resource 30 and obtains the data needed to enable application server 24 to return content for third frame 92 to client 16.

First frame 90 includes controls 94-98 for printing, e-mailing, and faxing a document or documents ultimately selected in second frame 92. Using controls 94, a user can instruct application 22 to print a selected document. Using controls 96 or 98, the user can instruct application 22 to send the selected document to a particular e-mail address or fax the document to a particular number.

Web page 88 includes controls 100-108. Controls 100 and 102 are text boxes enabling a user to manually provide credentials for accessing resource 30. Controls 104 and 105 are radio buttons enabling a user to set or modify policy data, if needed. Controls 106 and 108 are command buttons enabling a user to grant or deny authorization for application service 12 to access resource service 14.

Second frame 92 includes a scroll menu 110 displaying electronic documents managed by resource 30. In this example scroll menu 110 includes check boxes 112 allowing the user to select one or more of the displayed documents. Here, the document "catalog.doc" has been selected. Also included is pull down menu 114 and command buttons 116 and 118. Pull down menu 114 allows a user to select the type of files displayed in scroll menu 110. In this example "all files" is selected. A user may, however, desire to show, for example, only word processor documents or spreadsheets. Command buttons 116 and 118 allow a user to perform tasks such as deleting or renaming documents selected in scroll menu 110.

Figure 5:
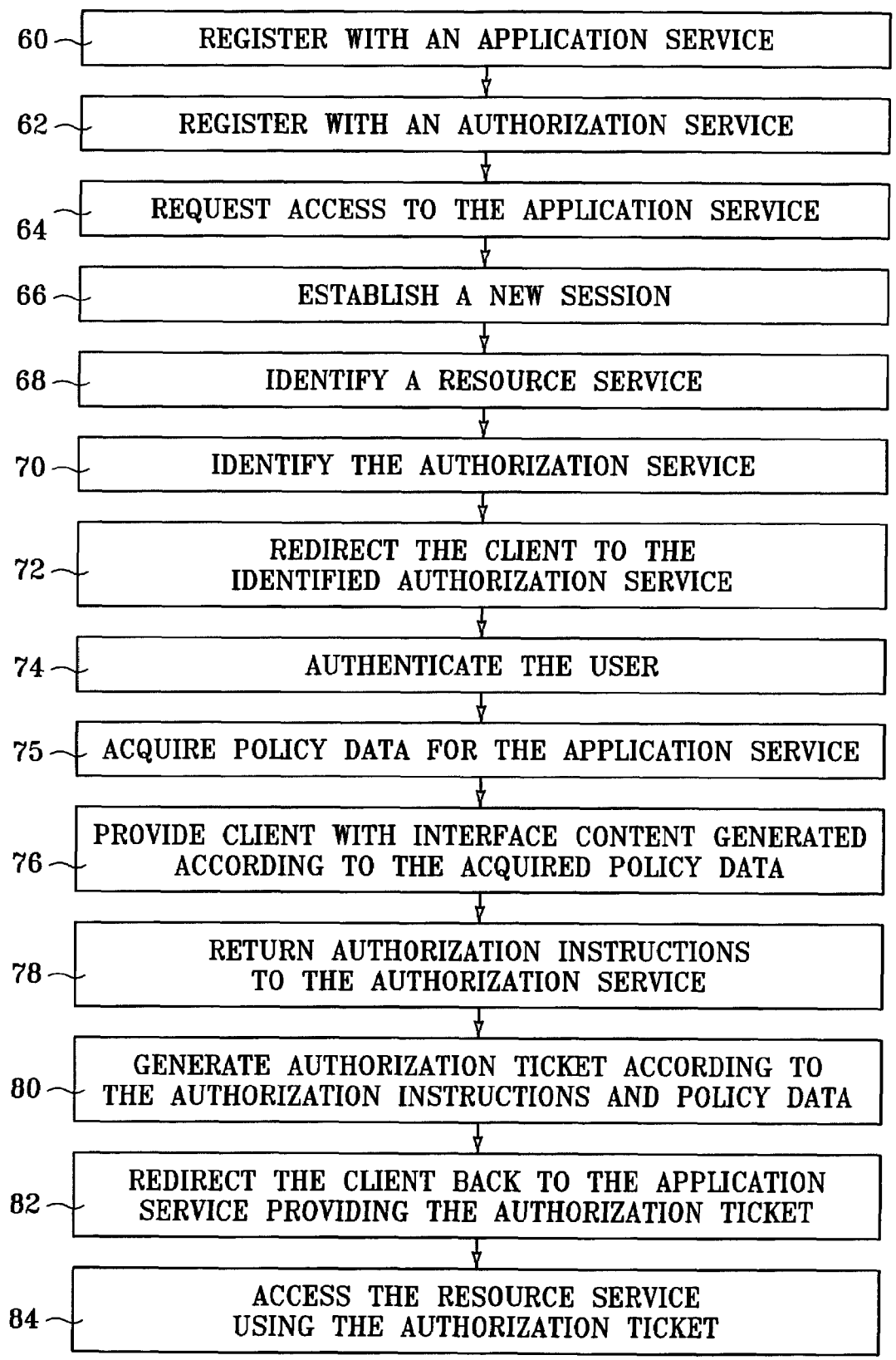
FIG. 5 is a flow diagram illustrating the steps taken to access a resource according to an embodiment of the present invention.

Although the flow chart of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 6 is exemplary only. There exist many possible layout and control configurations for interfaces that will allow a user to direct application service 12 while selecting electronic documents managed by resource service 14. FIG. 6 merely provides one such example.

CONCLUSION

Application service 12 cannot access resource service 14 without presenting an authorization certificate that can only be generated by authorization service 16. Beneficially, application service 12 cannot access resource service 14 without the user's consent or at least implicit knowledge.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method for granting a request from a first resource to access a second resource, comprising:

receiving, from a client, a request to access the first resource;

directing the client to an authorization service;

the authorization service generating an authorization ticket and providing the authorization ticket to the first resource;

on behalf of the first resource, presenting the authorization ticket and requesting access to the second resource; and granting the first resource access to the second resource only upon verification that the authorization ticket was generated by a source trusted by the second resource.

2. The method of claim 1, further comprising providing the authorization service with user credentials and the authorization service verifying the credentials before generating the authorization ticket.

3. The method of claim 1, further comprising acquiring an URL for the authorization service, and wherein directing the client to the authorization service comprises directing the client to the acquired URL.

4. The method of claim 1, wherein generating an authorization ticket comprises generating an authorization ticket that includes a trust indicator, and access indicator and a digital certificate identifying the source of the authorization ticket.

5. The method of claim 1, wherein providing the first resource with the authorization ticket comprises:

acquiring an URL for the first resource;

modifying the acquired URL by adding the authorization ticket; and directing the client to the modified URL.

6. The method of claim 1, further comprising acquiring an URL for the authorization service, modifying the URL by adding data for locating and accessing the first resource, wherein directing the client to the authorization service comprises directing the client to the modified URL, and wherein providing the authorization ticket to the first resource comprises the authorization service providing the authorization ticket to the first resource utilizing the data added to the URL.

7. The method of claim 1, further comprising acquiring an URL for the first resource, and wherein presenting the authorization ticket to the first resource comprises:

modifying the URL by adding data for locating and accessing the authorization ticket;

directing the client to the modified URL; and acquiring, on behalf of the first resource, the authorization ticket using the data added to the URL.

8. The method of claim 1, further comprising the authorization service acquiring an URL for the first resource, modifying the URL by adding the authorization ticket to the URL, and wherein the authorization service directing the client to the first resource comprises with instructions for the client to provide the first resource with the authorization ticket comprises directing the client to the modified URL.

9. The method of claim 1, further comprising the authorization service acquiring an access indicator for the first resource, and wherein generating an authorization ticket comprises generating an authorization ticket containing the access indicator, and wherein granting the first resource access to the second resource includes granting access according to the access indicator.

10. The method of claim 9, further comprising the authorization service acquiring an URL for the first resource modifying the URL by adding the authorization ticket to the URL, and wherein the authorization service directing the client to the first resource comprises with instructions for the client to provide the first resource with the authorization ticket comprises directing the client to the modified URL.

11. The method of claim 1, further comprising the authorization service acquiring a trust indicator for the first resource, and granting or denying authorization for the first resource to access the second resource as specified by the trust indicator, and wherein the authorization service generating an authorization ticket comprises the authorization service generating an authorization ticket only when authorization is granted.

12. The method of claim 11, wherein the trust indicator specifies that a user is to grant authorization, the method further comprising providing the client with interface content enabling a user to grant or deny authorization.

13. The method of claim 10, wherein the trust indicator specifies that the authorization service is to grant or deny authorization, the method further comprising the authorization service granting authorization.

14. The method of claim 1, wherein presenting the authorization ticket comprises presenting data used to retrieve the authorization ticket, the method further comprising retrieving the authorization ticket using the data presented.

15. A computer readable medium having instructions for:
receiving, from a client, a request to access a first resource;
directing the client to an authorization service to request an authorization ticket;
acquiring from the authorization service an authorization ticket following a request from the client; and
requesting, on behalf of the first resource, access to the second resource presenting the acquired authorization ticket.

16. The medium of claim 15, wherein the instructions for directing comprise acquiring an URL for the authorization service and directing the client to the URL.

17. The medium of claim 15, wherein:
the instructions for directing comprise acquiring a first URL for the authorization service, modifying the first URL by adding a second URL for the first resource, and directing the client to the modified first URL; and
the instructions for acquiring comprise instructions for receiving the authorization ticket from the client after the client has been directed by the authorization service back to the second URL.

18. A system for authorizing a first resource's request to access a second resource, comprising:
an authorization service operable to generate and provide an authorization ticket for accessing the second resource;
a server for the first resource operable to receive, from a client, a request to access the first resource;
a resource module for the first resource operable to direct the client to the authorization service to request an authorization ticket to enable the first resource to access the second resource, the resource module being further operable to acquire an authentication ticket generated by the authorization service following a request from the client and to request access to the second resource presenting an acquired authorization ticket; and
a security module for the second resource operable to grant the first resource access to the second resource only upon verification that an authorization ticket presented by the resource module was generated by a trusted source.

19. The system of claim 18, wherein the authentication service is further operable to acquire and authenticate credentials before generating an authorization ticket.

20. The system of claim 18, wherein the resource module is further operable to acquire an URL for the authorization service to direct the client to the authorization service by directing the client to the acquired URL.

21. The system of claim 18, wherein the authentication service is further operable to acquiring an URL for the first resource, to modify the acquired URL by adding the authorization ticket, and to direct the client to the modified URL, and wherein the resource module is operable to acquire the authorization ticket from the modified URL.

22. The system of claim 18, wherein the resource module is further operable to acquire an URL for the authorization service, to modify the URL by adding data for locating and accessing the first resource, and to direct the client to the modified URL, and wherein the authorization service is further operable to present a generated authorization ticket to the first resource using the data for locating and accessing the first resource.

23. The system of claim 18, wherein the authorization service is further operable to acquire an URL for the first resource, to modifying the URL by adding data for locating and accessing the authorization ticket, and to direct the client to the modified URL, and wherein the resource module is operable to acquire the authorization ticket using the data added to the URL.

24. The system of claim 18, wherein the authorization service is further operable to acquire an access indicator for the first resource and to generate an authorization ticket containing the access indicator, and wherein the security module is further operable to grant access according to the access indicator.

25. The system of claim 18, wherein the authorization service is further operable to acquire a trust indicator for the first resource, to provide the client with interface content enabling a user to grant or deny authorization and where the trust indicator specifies that a user is to grant authorization, to grant authorization where the trust data specifies that the authorization service is to do so, and to generate an authorization ticket only after authorization has been granted.

26. A system for authorizing a first resource's request to access a second resource, comprising:
a means for generating and providing an authorization ticket for accessing the second resource;
a means for receiving, from a client, a request to access the first resource;
a means for directing the client to the means for generating an authorization ticket to request an authorization ticket to enable the first resource to access the second resource;
a means for acquiring an authentication ticket generated following a request from the client;
a means for requesting, on behalf of the first resource, access to the second resource presenting an acquired authorization ticket; and
a means for granting the first resource access to the second resource only upon verification that a presented authorization ticket was generated by a trusted source.

* * * * *

UNITED STATES PATENT AND TRADEMARK OFFICE
CERTIFICATE OF CORRECTION

| | |
|---|---|
| PATENT NO. | : 7,444,414 B2 |
| APPLICATION NO. | : 10/193000 |
| DATED | : October 28, 2008 |
| INVENTOR(S) | : Ward S. Foster et al. |

It is certified that error appears in the above-identified patent and that said Letters Patent is hereby corrected as shown below:

In column 13, line 27, in Claim 15, after "to" delete "the" and insert -- a --, therefor.

Signed and Sealed this

Twenty-sixth Day of May, 2009

JOHN DOLL
*Acting Director of the United States Patent and Trademark Office*